INVENTORS
GUNARS ZVAIGZNE
DONALD A. EPSTEIN

BY *Owen L. Lamb*
AGENT

TIMING RING AND CHECKING CIRCUIT

United States Patent Office 3,400,367
Patented Sept. 3, 1968

3,400,367
TIMING RING AND CHECKING CIRCUIT
Donald A. Epstein and Gunars Zvaigzne, Poughkeepsie, N.Y., assignors to International Business Machines Corporation, New York, N.Y., a corporation of New York
Filed Sept. 28, 1964, Ser. No. 399,780
7 Claims. (Cl. 340—146.1)

ABSTRACT OF THE DISCLOSURE

A self-checked timing circuit. An oscillator source generates a train of true and complement oscillator pulses. A ring of storage triggers is stepped by clock pulses. A pair of check triggers is also stepped by clock pulses. The outputs of the oscillator, the check triggers, and the storage triggers are combined to produce the clock pulses synchronized with the oscillator source. One check trigger is turned on and off alternately by odd clock pulses. The other check trigger is turned on and off alternately by even numbered clock pulses. The check triggers have the same output levels during the complement oscillator cycle but have opposite output levels during the true oscillator cycle. A check circuit is provided for comparing the outputs of the check triggers and the oscillator pulses in such a manner that if the check triggers have the same output levels during a true cycle or have different output levels during a complement cycle an error is indicated.

Figure 1A:
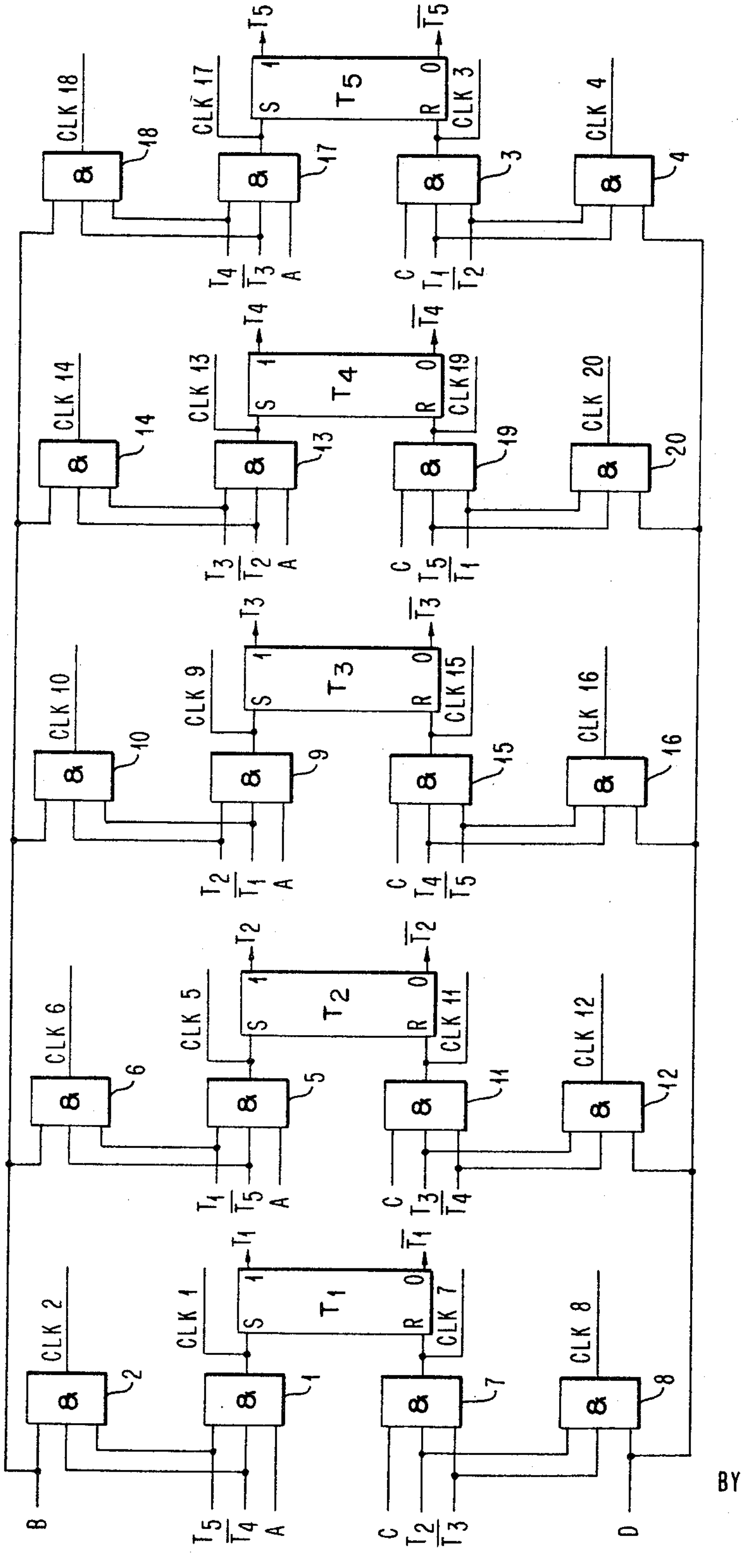

The invention relates to signal generators and more particularly to an electronic timing ring that is self-checked.

Signal generators may produce erroneous signals because of improperly functioning components. For example, the signal generator may cease to produce output signals. Further, undesirable signals may be generated simultaneously with desired signals, and finally the generator may generate output signals which are improperly timed.

It is therefore an object of this invention to provide an improved ring timing circuit.

It is a further object of this invention to provide improved apparatus for checking a ring timing circuit.

It is also an object of this invention to provide a ring timing circuit which is self-checked.

Briefly stated, the above objects are accomplished in accordance with the invention by providing an oscillator source which generates a train of true and complement pulses. A first ring comprised of check triggers is provided and is stepped by different combinations of clock pulses. The check triggers are stepped in such a way that they have the same output levels for the duration of the complement oscillator pulses but have opposite output levels for the duration of the true oscillator pulses. A second ring is provided which is also stepped by the clock pulses. The clock pulses themselves are generated by combining the true and complement outputs of the oscillator with the check trigger outputs to produce a series of pulses synchronized with the oscillator. These latter pulses are then combined with the outputs of the second ring to produce the clock pulses.

The operation of the entire timing circuit is checked by a check circuit which compares the outputs of the check triggers with the true and complement oscillator pulses. If the check triggers have the same output levels during the duration of a true oscillator pulse, or if the check triggers have different output levels during the duration of a complement oscillator pulse, an error is indicated.

The invention has the advantage that all single component errors in the ring and many failures in the checking logic itself may be detected.

The checking circuitry also has the advantage that it is very simple in implementation. The timing circuit has the advantage that the number of clock pulses may be increased without increasing substantially the error checking circuitry.

The foregoing and other objects, features, and advantages of the invention will be apparent from the following more particular description of a preferred embodiment of the invention, as illustrated in the accompanying drawings.

Figure 1B:
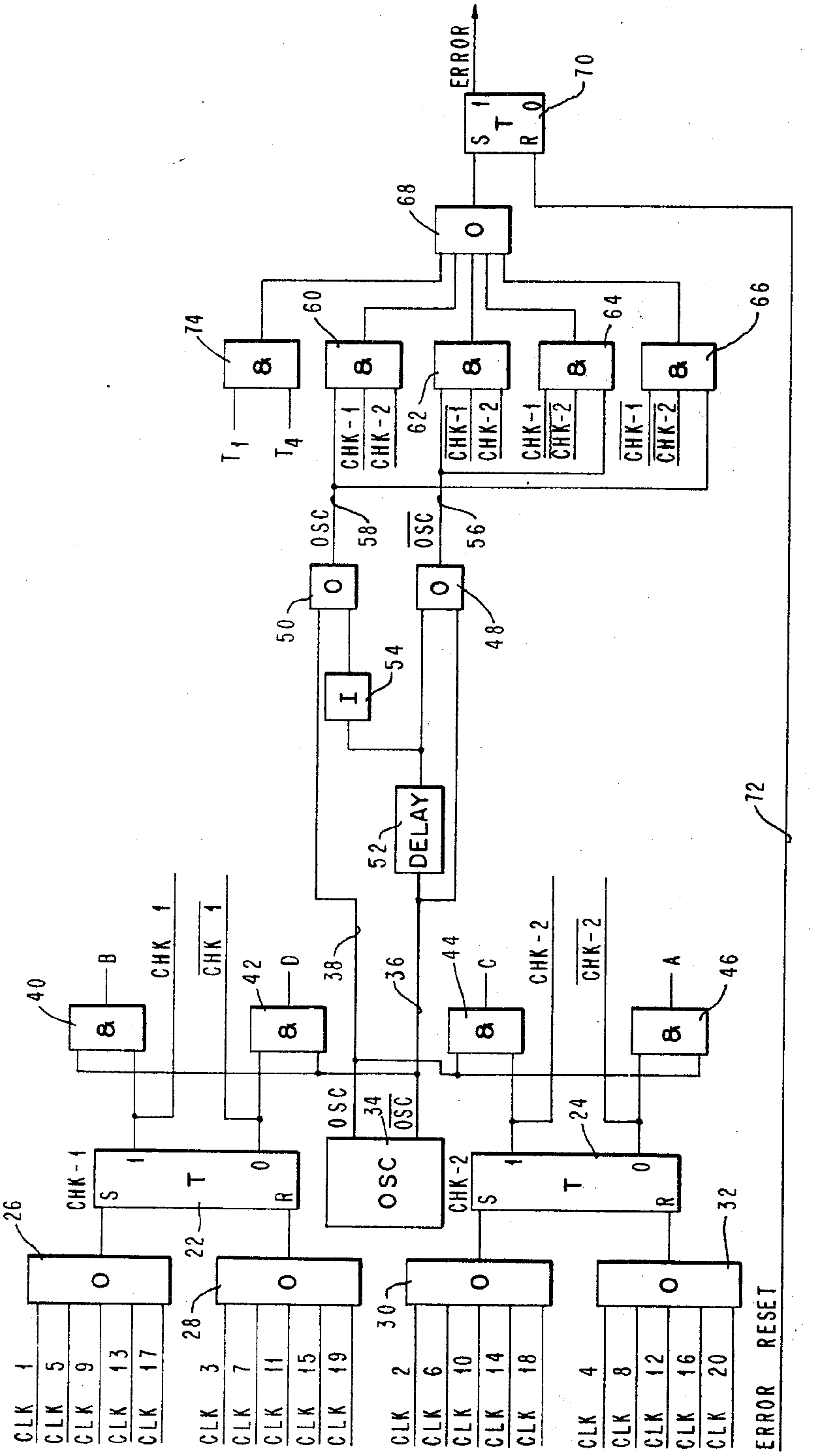
Figure 2:
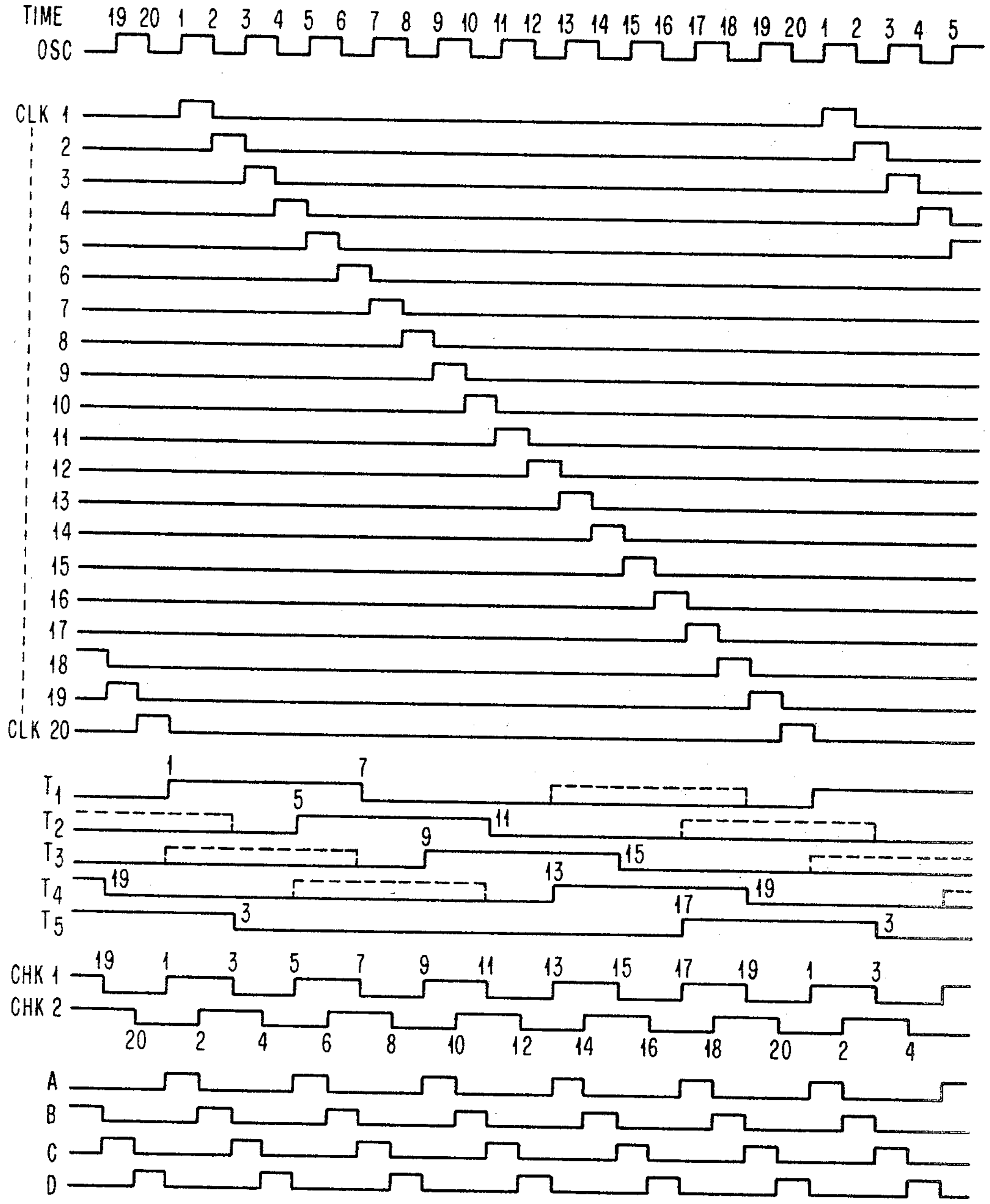

In the drawings:

FIG. 1*a* and FIG. 1*b* comprise a block schematic diagram of a ring circuit and checking circuit in which the invention is embodied; and FIG. 2 is a timing chart which illustrates the relative voltage potentials of various points in the circuit of FIGS. 1*a* and *b*.

Referring to FIG. 1*a*, the basic ring is comprised of five triggers, T1, T2, T3, T4, and T5. Sequential clock pulses CLK1 through CLK20 are generated by AND circuits 1 through 20 which combine various outputs of the basic ring triggers and an oscillator-dependent series of sequential pulses A, B, C, and D. The pulses A, B, C, and D are generated by the circuit shown in FIG. 1*b*. Check triggers 22 and 24 (FIG. 1*b*) are turned on and off sequentially by selected Ored clock pulses from the basic ring shown in FIG. 1*a*. The output of OR 26 sets trigger 22 and the output of OR 28 resets trigger 22. The output of OR 30 sets trigger 24 and the output of OR 32 resets trigger 24.

An oscillator 34 generates a series of oscillator pulses on line 36. The complement of these pulses appear on line 38. The outputs of oscillator 34 and the outputs of the check triggers 22 and 24 are combined in AND circuits 40, 42, 44 and 46 to provide a series of sequential pulses A, B, C, and D.

The oscillator pulse 38 also drives an OR circuit 50. The complement oscillator pulse 36 drives another OR circuit 48. The complement oscillator pulse 36 is also supplied to a delay circuit 52, the output of which drives OR 48 and an inverter 54. The output of inverter 54 drives the OR circuit 50. The purpose of this circuit is to produce elongated pulses on lines 56 and 58.

The outputs of check triggers 22 and 24 are combined in AND circuits 60, 62, 64 and 66 to provide an input to the error trigger 70 via OR 68. An error reset input 72 is provided to the error trigger 70. The outputs of triggers T1 and T4 from the ring shown in FIG. 1*a* are ANDed in AND 74 providing a further input to the OR 68.

The operation of the circuit of FIG. 1*a* and FIG. 1*b* will now be described in detail with reference to the timing chart shown in FIG. 2. Initially, at a time just prior to 1-time, check triggers 22 and 24 are reset. The oscillator output 36 is negative, triggers T1 through T4 are reset and trigger T5 is set. When the true oscillator pulse rises at 1-time it causes an output A from AND circuit 46 since the input $\overline{\text{CHK2}}$ is positive. The coincidence of T5, $\overline{\text{T4}}$ and A in AND 1 produces an output CLK1 turning on trigger T1. In FIG. 1*b*, CLK1 energizes the output of OR 26 thus turning on check trigger 22.

At 2-time the true oscillator pulse drops. The complement oscillator pulse $\overline{\text{OSC}}$ therefore rises and since check trigger 22 is now positive, AND circuit 40 is energized causing a pulse B to be emitted from its output. In FIG. 1*a*, the coincidence of a B pulse, T5 and $\overline{\text{T4}}$ causes a CLK-2 output to be emitted from AND circuit 2. The CLK2 pulse output energizes OR circuit 30 to thus turn on check trigger 24.

At 3-time the true oscillator pulse again rises. A pulse B output is issued from AND 44 because CHK-2 is positive. T1 is on. T1, $\overline{\text{T2}}$ and C pulse causes CLK3 to issue from AND 3. CLK3 turns off check trigger 22 and trigger T5.

At 4-time, pulse D is generated from AND 42. T1 is on. T1, $\overline{T2}$ and C combine in AND 4 to produce CLK4. CLK4 resets check trigger 24. Thus the check triggers have returned to their original state after four timing pulses. The sequence continues for the remainder of the 20 timing pulses.

Triggers T1–T5 are driven in an overlapping manner to avoid spikes on the outputs of AND circuits 4, 8, 12 and 16 at the respective clock times 4, 8, 12, and 16. The spikes would occur if these triggers were turned off at these respective clock times.

The stepping of check triggers 22, 24 is dependent upon the proper generation of clock pulses. Three types of error conditions may occur. First, a clock pulse may fail to turn on. Second, a clock pulse may fail to turn off. Third, a clock pulse may occur at the wrong time. The first two types of errors cause an incorrect sequence in the operation of check triggers 22, 24. The relative phase of the check triggers is checked by comparing the outputs of the check triggers with the output of the oscillator 34. The relationship is expressed as follows:

$$\text{Error function} = (OSC)(CHK1)(CHK2) + \overline{(OSC)}\,\overline{(CHK1)}(CHK2) + \overline{(OSC)}(CHK1)\overline{(CHK2)} + (OSC)\overline{(CHK1)}\,\overline{(CHK2)}$$

Any incorrect sequence in the stepping of the check triggers causes one of the terms in the above expression to become a logical one and to set the error trigger 70. The logic for satisfying the above equation is comprised of AND circuits 60, 62, 64 and 66; and OR circuit 68. It will be understood by those skilled in the art that any circuitry satisfying the above equation may be substituted for the logic shown. For example, an Exclusive OR parity check of OSC, CHK1 and CHK2 may be used.

The third type of error may occur without affecting the relative phases of the check triggers 22 and 24. For example, noise may cause the ring in FIG. 1*a* to operate in two modes simultaneously, without affecting the stepping of check triggers 22 and 24. For example, suppose a noise pulse turns on trigger T1. The fact that T1 is on and T5 is off will turn trigger T2 on as shown in phantom in FIG. 2. This will cause a sequence of stepping of triggers T1–T5 concurrently with the correct stepping of these triggers. However, the stepping of check triggers 22 and 24 will not be affected because while a CLK1 pulse is being generated at time 13 check trigger 22 is being turned on by clock pulse 13. The occurrence of an erroneous CLK1 pulse will have no effect in changing the sequence of the check trigger because both clock 1 and clock 13 can legitimately turn CHK1 on via OR 26 in FIG. 1*b*. Thus, without further checking, the erroneous sequence shown in phantom in FIG. 2 can be sustained without detection.

This erroneous sequence can be detected by ANDing together the outputs of two of the triggers T1–T5 to check for erroneous overlap. In the embodiment shown, T1 and T4 are ANDed together. By examining the timing diagram of FIG. 2 it is seen that triggers T1 and T4 will always overlap at some time when an erroneous sequence (shown in phantom) is being sustained. Any other pair of similarly separated triggers could be used for this check. For example, T2 and T5 ANDed together will detect the erroneous sequence.

In the embodiment shown, twenty clock pulses are generated. It is possible to expand the size of the timing circuit to provide for more clock pulses without adding substantially to the error checking circuitry. This is accomplished, for example, by adding groups of five trigger stages (e.g., T6–T10) to the ring shown in FIG. 1*a*, and by adding appropriate inputs to the OR circuits 26, 28, 30, and 32. A similar pattern of clock pulses is used to control the sequence of the check triggers. For example, clock 21 turns on check trigger 1, clock 22 turns on check trigger 2, clock 23 turns off check trigger 1, clock 24 turns off check trigger 2, etc.

In summary, in accordance with the invention two ring circuits are provided. The first ring is comprised of check triggers 22, 24 (FIG. 1*a*), the outputs of which combine in AND circuits 40, 42, 44, 46 with the true and complement outputs of an oscillator 34 to provide first sequential pulses A, B, C, and D. These pulses are used to derive clock pulses which drive another ring circuit comprised of triggers T1–T5 (FIG. 1*a*). The outputs of the second ring circuit are combined with the first sequential pulses A, B, C and D at AND circuits 1, 2, . . . 20 to provide twenty sequentially timed clock pulses CLK1–CLK20 which comprise the outputs of the timing circuit.

Checking of the timing circuit is accomplished by checking the outputs of the check triggers 22, 24, for proper phase. The check triggers are set and reset sequentially by the clock pulses in an overlapping manner. Since the clock pulses control the stepping of the check triggers, the two rings are interdependent, and therefore checking only the check triggers is sufficient to check the entire timing circuit.

While the invention has been particularly shown and described with reference to a preferred embodiment thereof, it will be understood by those skilled in the art that the foregoing and other changes in form and details may be made therein without departing from the spirit and the scope of the invention.

What is claimed is:

1. A timing circuit comprising:
an oscillator;
a first ring circuit comprised of check triggers responsive to clock pulses;
means combining the outputs of said check triggers and said oscillator to provide first sequential pulses;
a second ring circuit responsive to clock pulses;
means combining the outputs of said second ring circuit and said first sequential pulses to provide a plurality of sequential clock pulses;
means for stepping said first ring with selected ones of said clock pulses; and
means for stepping said second ring with selected ones of said clock pulses.

2. The combination according to claim 1 including checking means for checking the relative phase of the outputs of said first ring to detect a failure of said timing circuit.

3. A self-checked timing circuit comprising:
an oscillator source for generating a train of true and complement oscillator pulses;
a first ring of check triggers responsive to clock pulses such that said triggers have the same output levels during the complement oscillator cycle, and have opposite output levels during the true oscillator cycle;
a second ring of storage units responsive to clock pulses;
means combining the outputs of said oscillator and said first and second rings to produce clock pulses synchronized with said oscillator source; and
a check circuit for comparing the outputs of the check triggers with the oscillator pulses in such a manner that if the check triggers have the same output levels during a true oscillator cycle, or have different output levels during a complement oscillator cycle, an error is indicated.

4. In a circuit for generating a series of clock pulses synchronized with an oscillator source:
a pair of check triggers;
means for turning one of said check triggers on and off alternately with odd numbered clock pulses;
means for turning the other of said check triggers on and off alternately with even clock pulses;
a plurality of storage triggers;
means for stepping said storage triggers as a ring by setting and resetting each of said storage triggers with selected ones of the clock pulses; and means combining the outputs of said oscillator, said check triggers and said storage triggers to thereby generate the clock pulses.

5. The combination according to claim 4 including means for comparing the outputs of the check triggers with the output of the oscillator for proper phase relationship.

6. The combination according to claim 4 wherein the storage triggers are set such that each succeeding trigger of the ring turns on before the previous trigger turns off.

7. The combination according to claim 6 including checking means for detecting improper sequencing of said storage triggers caused by erroneously generated clock pulses, by detecting the coincidence of at least any two non-adjacent storage triggers which during correct sequencing do not overlap.

References Cited

UNITED STATES PATENTS

| | | | |
|---|---|---|---|
| 3,017,620 | 1/1962 | Abzug | 340—248 |
| 3,088,095 | 4/1963 | Delmege | 340—146.1 |
| 3,163,847 | 12/1964 | O'Connor | 340—146.1 |

OTHER REFERENCES

Ormes, R. B., and Stephens, C. E.: Ring Check Circuit, IBM Technical Disclosure Bulletin, vol. 1, No. 3, October 1958.

MALCOLM A. MORRISON, *Primary Examiner.*

C. E. ATKINSON, *Assistant Examiner.*